(12) United States Patent
van Hassel et al.

(10) Patent No.: US 6,565,632 B1
(45) Date of Patent: May 20, 2003

(54) ION-TRANSPORT MEMBRANE ASSEMBLY INCORPORATING INTERNAL SUPPORT

(75) Inventors: Bart Antonie van Hassel, Getzville, NY (US); Ravi Prasad, East Amherst, NY (US); Jack Chen, Getzville, NY (US); Jonathan Lane, Amherst, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 10/015,622

(22) Filed: Dec. 17, 2001

(51) Int. Cl.[7] .................. B01D 53/22; B01D 69/04; B01D 71/02
(52) U.S. Cl. .................. 96/10; 96/11; 95/54; 95/55
(58) Field of Search .................. 95/45, 54, 55; 96/4–14

(56) References Cited

U.S. PATENT DOCUMENTS

| | | | |
|---|---|---|---|
| 3,630,690 A | * 12/1971 | Coppola | |
| 4,514,302 A | * 4/1985 | Van Zon et al. | 210/433.2 |
| 4,865,630 A | * 9/1989 | Abe | 55/158 |
| 5,160,713 A | * 11/1992 | Mazanec et al. | 423/210 |
| 5,498,278 A | * 3/1996 | Edlund | 96/11 |
| 5,599,383 A | 2/1997 | Dyer et al. | 96/8 |
| 5,681,373 A | * 10/1997 | Taylor et al. | 96/11 |
| 5,712,220 A | * 1/1998 | Carolan et al. | 502/400 |
| 5,817,597 A | * 10/1998 | Carolan et al. | 502/400 |
| 5,820,654 A | * 10/1998 | Gottzman et al. | 95/54 |
| 5,938,822 A | * 8/1999 | Chen et al. | 96/11 |
| 6,056,807 A | 5/2000 | Carolan et al. | 96/4 |
| 6,139,810 A | * 10/2000 | Gottzmann et al. | 422/197 |
| 6,368,383 B1 | * 4/2002 | Virkar et al. | 95/54 |

FOREIGN PATENT DOCUMENTS

EP  0285727  2/1992

* cited by examiner

*Primary Examiner*—Robert H. Spitzer
(74) *Attorney, Agent, or Firm*—David M. Rosenblum

(57) ABSTRACT

An ion-transport membrane assembly including a tubular, ion-transport membrane that is fabricated from one or more ion-transport, ceramic materials capable of ionic transport at an operational temperature of greater than 400° C. The membrane may be an oxygen transport membrane or a hydrogen transport membrane. A plurality of structural supporting members, fabricated from an open porous material and having an outer cylindrical surface, are inserted within the membrane, without being bonded to the membrane, to inhibit inward collapse of the membrane under application of a pressure applied to an exterior surface of the membrane. The structural supporting members are configured to permit relative movement between the outer surface of the structural supporting member and the interior surface of the tubular membrane during heating to or cooling from the operational temperature thereof.

9 Claims, 1 Drawing Sheet

ION-TRANSPORT MEMBRANE ASSEMBLY INCORPORATING INTERNAL SUPPORT

FIELD OF THE INVENTION

The present invention relates to ion-transport membranes of tubular form that are fabricated from ceramics that are capable of separating oxygen or hydrogen from a feed through ion transport. More particularly, the present invention relates to such a membrane that is internally supported by one or more structural members to prevent inward collapse of the membrane under the application of pressure.

BACKGROUND OF THE INVENTION

There exist ceramic materials that exhibit an ion-transport capability of either oxygen ions or protons at elevated temperatures and upon the application of a differential pressure to opposite surfaces of the material. Ceramic materials that have an oxygen ion-transport capability can be used to fabricate oxygen transport membranes to separate oxygen from an oxygen containing feed. Ceramic materials that possess a proton conducting capability can be used to construct hydrogen transport membranes to separate hydrogen from a hydrogen containing feed. For instance, in oxygen transport membranes, an oxygen containing feed contacts a cathode side of the membrane in which the oxygen is ionized by gaining two electrons. The oxygen ions travel through the ceramic material making up the membrane and emerge from an opposite anode side. At the anode side, the oxygen ions lose the electrons to reconstitute the oxygen molecules.

In mixed conducting ceramic materials, the electrons travel from the anode side to the cathode side of the membrane to ionize the oxygen. In ionic conducting materials, external electrodes are applied to the membrane to provide a return path for the electrons. In dual phase conducting materials, a metallic phase is incorporated into the ceramic material to serve as a return pathway for the electrons. The driving force for the ion-transport is a pressure differential. For instance, in case of an oxygen transport membrane, the oxygen partial pressure at the cathode side of the membrane is greater than that at the anode side. Hydrogen transport membranes function in a similar fashion.

Ion-transport membranes can be formed as an array of ceramic membrane tubes. In case of an oxygen transport membrane array, an oxygen containing feed, for instance, air, is applied, depending on the design of the array, to the inner or outer surfaces of the tubes under pressure. At the same time, the tubes are heated by a variety of known techniques to an elevated operating temperature. The oxygen separated from the oxygen containing feed by the array can be discharged or reacted with an externally fed substance or substances in the presence of a catalyst. For instance, a steam and hydrocarbon containing feed can be introduced to the anode sides of an array of membrane tubes to produce a synthesis gas in the presence of a known steam methane reforming catalyst.

All ceramic materials, including ceramic membrane materials, to some degree or other, tend to exhibit a behavior known as creep. Creep can be defined as permanent plastic deformation due to an applied stress. Creep deformation tends to increase as the applied stress and as operational temperatures increase. Ceramic ion-transport membranes are susceptible to creep because they operate at a temperature above 400° C., preferably in a range of between about 500° C. and about 1200° C. and more commonly, between about 800° C. and about 1000° C. The pressure applied to the outside of the ceramic membrane tubes produces a stress distribution which, in combination with the elevated temperature, produces creep.

Creep ideally tends to cause a tubular, ion-transport membrane subjected to an external pressure to deform in a manner that produces a reduction in tube diameter and an increase in tube wall thickness. The foregoing is an ideal deformation in that few, if any, tubes will deform in such a manner due to manufacturing imperfections. Such imperfections result in an unsymmetrical stress distribution in the tubes when an external pressure is applied. The uneven stress distribution in turn tends to produce uneven deformations within different portions of the tube that act to accentuate the uneven stress distribution. This mechanism leads to further uneven deformation. Eventually the tube will buckle to assume a squashed, virtually flat appearance. Common manufacturing imperfections in a ceramic membrane tube include: uneven wall thickness; ovality; and lack of material homogeneity.

It has been found that the deformation and failure process due to creep occurs more quickly, the higher the creep rate of the ceramic, the higher the temperature, the greater the pressure differential, and the greater the degree of manufacturing irregularities.

In the prior art, there exist tubular, ion-transport membrane structures that are internally reinforced and therefore, naturally resist creep effects. An example of this can be found in U.S. Pat. No. 5,599,383. In this patent, membranes are disclosed in which a tubular dense mixed conducting oxide layer, that is capable of conducting oxygen ions at elevated temperature, is applied as an outer layer to a solid, porous rod-like structure. As may be appreciated, the thermal expansion characteristics of the central rod-like structure must be the same as or at least very similar to the mixed conducting oxide layer. Differential thermal expansion characteristics will cause breakage of adjoining layers. In this patent, this is not a problem because the central rod-like structure is an active layer that serves to separate oxygen. As such it can be made of the same material as the adjoining mixed conducting oxide layer or at least a material having similar thermal expansion characteristics.

As will be discussed, the present invention provides a structural supporting member for a tubular ceramic membrane. The structural supporting member helps the membrane resist creep and does not have to be formed of a material that has similar thermal expansion characteristics to the tubular membrane being supported. Further advantages of the present invention will become apparent from the following discussion.

SUMMARY OF THE INVENTION

The present invention provides an ion-transport membrane assembly that comprises a tubular, ion-transport membrane and a plurality of structural supporting members. The tubular, ion-transport membrane is in the form of a tube and is fabricated from at least one ceramic, ion-transport material capable of ionic transport at an operational temperature of greater than about 400° C. Such a material can be a mixed conductor that conducts both ions and electrons or can be an ionic conductor that solely conducts ions. The material can also be a dual phase conductor in which a metallic phase composed of a metallic oxide or a metal is used for electronic conduction. Additionally, the membrane may either be an oxygen transport membrane that serves to separate oxygen or a hydrogen transport membrane that acts to separate hydrogen through conduction of protons.

The plurality of structural supporting members are fabricated from an open porous material that has an outer cylindrical surface. Moreover, the plurality of structural supporting members is inserted within the membrane, without being bonded to the membrane, to inhibit inward collapse of the membrane under application of pressure applied to an exterior surface of the membrane. The plurality of structural supporting members is configured to permit relative movement between the outer cylindrical surface thereof and an interior surface of the tubular, ion-transport membrane when the temperature of the ion-transport membrane assembly increases to and decreases from the operational temperature. Thus, thermal characteristics of the structural supporting member do not have to be matched to the ceramic membrane. For instance, the ceramic membrane might be a perovskite while the structural supporting member could be alumina. Moreover, since the plurality of structural supporting members are simply inserted into the tubular membrane construction, expensive and time consuming fabrication steps involving the application of membrane layers onto the structural supporting member is avoided.

Each of the plurality of structural supporting members is preferably a porous, rod-like cylinder. The tubular, ion-transport membrane can be a composite membrane having a dense layer connected to at least one porous layer. A thin dense layer is routinely used to decrease the resistance to transport of ions and the porous layer provides an active enhanced surface area. There can be one or more porous layers on one side of the dense layer or sandwiching the dense layer. The at least one ion-transport material can be a mixed conductor capable of transporting oxygen ions. Preferably the porous material has a porosity of between about 20% and about 90%. More preferably the porous material has a porosity of between about 40% and about 85%. Preferably the porous material is fabricated from a reticulated foam. The porous material is preferably MgO, $Al_2O_3$, $CeO_2$, or $ZrO_2$.

BRIEF DESCRIPTION OF THE DRAWINGS

While the specification concludes with claims distinctly pointing out the subject matter that Applicants regard as their invention, it is believed that the invention will be better understood when taken in connection with the accompanying figures in which:

DETAILED DESCRIPTION

Figure 1:
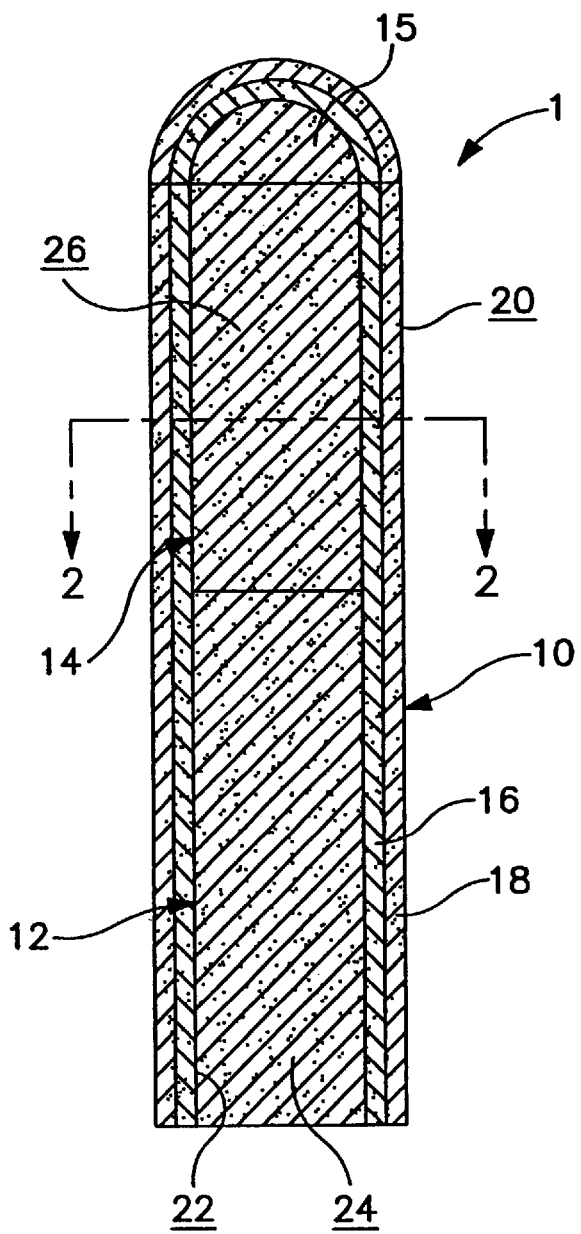
FIG. 1 is an elevational, cross-sectional schematic view of an ion-transport membrane assembly in accordance with the present invention.
Figure 2:
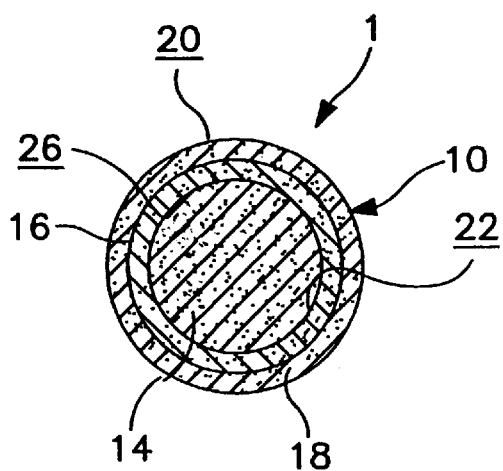
FIG. 2 is a sectional view of FIG. 1 taken along line 2—2.

With reference to FIGS. 1 and 2, an ion-transport membrane assembly 1 in accordance with the present invention is illustrated. Ion-transport membrane assembly 1 includes a tubular, ion-transport membrane 10 and structural supporting members 12 and 14 that are inserted within tubular, ion-transport membrane 10.

Tubular, ion-transport membrane 10 is provided with an inner, impervious dense layer 16 and an outer porous layer 18. As can be appreciated, embodiments of the present invention are possible in which the dense and porous layers are reversed or multiple porous layers are used or in which the dense layer is sandwiched between porous layers. As mentioned above, inner, impervious dense layer 16 and outer porous layer 18 can be formed of either oxygen selective or hydrogen selective ceramic materials. Representative mixed conducting materials are set forth in the following table:

TABLE I

Mixed Conducting Solid Electrolytes

Material Composition

1. $(La_{1-x}Sr_x)(Co_{1-y}Fe_y)O_{3-\delta}$ ($0 \leq x \leq 1$, $0 \leq y \leq 1$, $\delta$ from stoichiometry)
2. $SrMnO_{3-\delta}$ ($\delta$ from stoichiometry)
   $SrMn_{1-y}Co_yO_{3-\delta}$ ($0 \leq y \leq 1$, $\delta$ from stoichiometry)
   $Sr_{1-x}Na_xMnO_{3-\delta}$ ($0 \leq x \leq 1$, $\delta$ from stoichiometry)
3. $BaFe_{0.5}Co_{0.5}YO_3$
   $SrCeO_3$
   $YBa_2Cu_3O_{7-\delta}$ ($0 \leq \delta \leq 1$, $\delta$ from stoichiometry)
4. $La_{0.2}Ba_{0.8}Co_{0.8}Fe_{0.2}O_{2.6}$; $Pr_{0.2}Ba_{0.8}Co_{0.8}Fe_{0.2}O_{2.6}$
5. $A_xA'_{x'}A''_{x''}B_yB'_{y'}B''_{y''}O_{3-\delta}$ ($x,x',x'',y,y',y''$ all in 0–1 range)
   Where: A,A',A'' = from groups 1,2,3 and f-block lanthanides
   B,B',B'' = from d-block transition metals
   $\delta$ from stoichiometry
6. (a) Co-La-Bi type:  Cobalt oxide       15–75 mole %
                       Lanthanum oxide    13–45 mole %
                       Bismuth oxide      17–50 mole %
   (b) Co-Sr-Ce type:  Cobalt oxide       15–40 mole %
                       Strontium oxide    40–55 mole %
                       Cerium oxide       15–40 mole %
   (c) Co-Sr-Bi type:  Cobalt oxide       10–40 mole %
                       Strontium oxide     5–50 mole %
                       Bismuth oxide      35–70 mole %
   (d) Co-La-Ce type:  Cobalt oxide       10–40 mole %
                       Lanthanum oxide    10–40 mole %
                       Cerium oxide       30–70 mole %
   (e) Co-La-Sr-Bi type: Cobalt oxide     15–70 mole %
                       Lanthanum oxide     1–40 mole %
                       Strontium oxide     1–40 mole %
                       Bismuth oxide      25–50 mole %
   (f) Co-La-Sr-Ce type: Cobalt oxide     10–40 mole %
                       Lanthanum oxide     1–35 mole %
                       Strontium oxide     1–35 mole %
                       Cerium oxide       30–70 mole %
7. $Bi_{2-x-y}M'_xM_yO_{3-\delta}$ ($0 \leq x \leq 1$, $0 \leq y \leq 1$, $\delta$ from stoichiometry)
   where M' = Er, Y, Tm, Yb, Tb, Lu, Nd, Sm, Dy, Sr, Hf, Th, Ta, Nb, Pb, Sn,
   In, Ca, Sr, La and mixtures thereof
   M = Mn Fe, Co, Ni, Cu and mixtures thereof
8. $BaCe_{1-x}Gd_xO_{3-x/2}$ where, x equals from zero to about 1
9. One of the materials of $A_sA'_tB_uB'_vB''_wO_x$ family whose composition is disclosed in U.S Pat. No. 5,306,411 (Mazanec et al.) as follows:
   A represents a lanthanide or Y, or a mixture thereof;
   A' represents an alkaline earth metal or a mixture thereof;
   B represents Fe;
   B' represents Cr or Ti, or a mixture thereof;
   B'' represents Mn, Co, V, Ni or Cu, or a mixture thereof;
   and s,t,u,v,w, and x are numbers such that:
   s/t equals from about 0.01 to about 100;
   u equals from about 0.01 to about 1;
   v equals from zero to about 1;
   w equals from zero to about 1;
   x equals a number that satisfies the valences of the A, A', B, B', B'' in the formula; and $0.9 < (s + t)/(u + v + w) < 1.1$
10. One of the materials of $La_{1-x}Sr_xCu_{1-y}M_yO_{3-\delta}$ family, where: M represents Fe or Co;
    x equals from zero to about 1;
    y equals from zero to about 1;
    $\delta$ equals a number that satisfies the valences of La, Sr, Cu, and M in the formula
11. One of the materials of $Ce_{1-x}A_xO_{2-\delta}$ family, where:
    A represents a lanthanide, Ru, or Y; or a mixture thereof;
    x equals from zero to about 1;
    $\delta$ equals a number that satisfies the valences of Ce and A in the formula
12. One of the materials of $Sr_{1-x}Bi_xFeO_{3-\delta}$ family, where:
    x equals from zero to about 1;
    $\delta$ equals a number that satisfies the valences of Sr, Bi, and Fe in the formula

TABLE I-continued

Mixed Conducting Solid Electrolytes

Material Composition

13. One of the materials of $Sr_xFe_yCO_zO_{3-\delta}$ family, where:
    x equals from zero to about 1;
    y equals from zero to about 1;
    z equals from zero to about 1;
    δ equals a number that satisfies the valences of Sr, Fe and Co in the formula
14. Dual phase mixed conductors (electronic/ionic):
    $(Pd)_{0.5}/(YSZ)_{0.5}$
    $(Pt)_{0.5}/(YSZ)_{0.5}$
    $(LaCr_{1-y}Mg_yO_{3-\delta})_{0.5}(YSZ)_{0.5}$
    y equals from zero to about 1;
    δ equals a number that satisfies the valences of La, Cr, and Mg in the formula
    $(In_{90\%}Pt_{10\%})_{0.5}/(YSZ)_{0.5}$
    $(In_{90\%}Pt_{10\%})_{0.5}/(YSZ)_{0.5}$
    $(In_{95\%}Pr_{2.5\%}Zr_{2.5\%})_{0.5}/(YSZ)_{0.5}$
    Any of the materials described in 1–13, to which a high temperature metallic phase (e.g, Pd, Pt, Ag, Au, Ti, Ta, W) is added Tubular, ion-transport membrane 10 is illustrated as being in a form of a closed end tube. As well known in the art, open ended tubes are possible as the present invention has application to such tube forms. Additionally, although not illustrated, in case of tubular, ion-transport membrane 10, or open ended membranes, a sealed supporting structure, as well known in the art, is required to connect the membrane for instance, a tube sheet.

In operation, tubular, ion-transport membrane 10 is heated to an elevated temperature and subjected to an elevated pressure on its exterior surface 20. This elevated pressure can be produced by high total pressures inherent in steam methane reforming reactions or high pressure, oxygen containing feeds such as compressed air. In case of an oxygen transport membrane in which the pressure is due to an exterior application of compressed air, oxygen ions are transported through tubular, ion-transport membrane 10 and reconstitute to form oxygen molecules on an interior surface 22 thereof. Over time, the elevated temperature, greater than 400° C. and the application of external pressure can cause the material making up tubular, ion-transport membrane 10 to creep. As mentioned above, the creep tends to cause significant deformations of tubular, ion-transport membrane 10 until it fails or is possibly squashed.

In order to resist such tube destruction, structural supporting members 12 and 14 are inserted into tubular, ion-transport membrane 10. Structural supporting members 12 and 14 which are in the form of porous, rod-like cylinders that are inserted within tubular, ion-transport membrane 10 to inhibit the inward collapse of tubular, ion-transport membrane 10 under application of the pressure applied to exterior surface 20 thereof. As illustrated, structural supporting member 14 has a rounded end 15 to provide support to the inside of the closed end of tubular, ion-transport membrane 10.

Although two structural supporting members 12 and 14 are illustrated, multiple structural supporting members could be used in very long tubular, ion-transport membranes. As the length of the tubular ceramic ion-transport membrane increases more structural supporting members (such as designated by reference numbers 12 and 14) are required in order to permit full insertion of structural supporting members past such internal obstructions such as kinks, bends and other imperfections that could exist within a tubular structure of tubular, ion-transport membrane 10. By the same token, the use of multiple sections is required to prevent tubular, ion-transport membrane 10 from hanging-up on the structural supporting members 12 and 14, at such internal obstructions, during the expansion or contraction occurring during heating and cooling transients. For example, for each one meter of tube length, twenty structural supporting members such as 12 and 14 are used. However, as could be appreciated, even more structural supporting members might be used. In any case, the structural supporting members are sized in a lengthwise direction to completely fill the tubular, ion-transport membrane 10 when the same is fully heated to its operational temperature given the relevant coefficients of thermal expansion.

It is to be noted that although porous, rod-like forms were used, porous, cylindrical tube forms could be used where less structural support were required. In this regard, two half cylinders could serve as a structural support.

It is important that structural supporting members 12 and 14 be configured, by being sized and/or made of a material that permits relative movement between outer cylindrical surfaces 24 and 26 thereof and interior surface 22 of tubular, ion-transport membrane 10 as the temperature of tubular, ion-transport membrane 10 increases to and decreases from its operational temperature. For instance, if structural supporting members 12 and 14 just fit within tubular, ion-transport membrane 10 (under low temperature ambient conditions), and the material of structural supporting members 12 and 14 has a greater thermal coefficient of expansion than the material of tubular, ion-transport membrane 10, breakage of the membrane will occur during heating. This problem does not occur when structural supporting members 12 and 14 are made of a material with a lower coefficient of expansion than tubular, ion-transport membrane 10 in that there will also be a clearance between the support and the membrane after the same has been heated. In this regard, with the use of the preferred supporting materials given below and the mixed conducting materials given in the table above, there will always be a slight clearance due to the fact that such mixed conducting materials have a higher coefficient of thermal expansion than the supporting materials.

Since structural supporting members 12 and 14 are not bonded to tubular, ion-transport membrane 10, very robust, creep resistant materials can be used such as MgO, $Al_2O_3$, $CeO_2$, or $ZrO_2$ for structural supporting members 12 and 14. Preferably, structural supporting members 12 and 14 are fabricated from an open cell foam that is to be made of $Al_2O_3$. The porosity of any material used can be between about 20% and about 90%. More preferably, the porosity is between about 40% and about 85%. Such porosity allows for sufficient transport of gases through its structure. As may be further appreciated, structural supporting members 12 and 14 could be fabricated from the same material as ceramic membrane 10.

While the present invention has been described with reference to a preferred embodiment, as will occur to those skilled in the art, numerous changes, additions and omissions may be made without departing from the spirit and scope of the present invention as set forth in the appended claims.

We claim:
1. An ion-transport membrane assembly comprising:
   a tubular, ion-transport membrane fabricated from at least one ion-transport, ceramic material capable of ionic transport when subjected to an external pressure and an operational temperature of greater than about 400° C.; and a plurality of structural supporting members fabricated from an open porous material and having an outer cylindrical surface;

the plurality of structural supporting members inserted within said membrane, without being bonded to said membrane, to inhibit inward collapse of said membrane under application of said external pressure applied to an exterior surface of said membrane;

the plurality of structural supporting members configured to permit relative movement between said outer cylindrical surface thereof and an interior surface of said tubular, ion-transport membrane when temperature of said ion-transport membrane assembly increases to and decreases from said operational temperature.

2. The ion-transport membrane assembly of claim 1, wherein each of the plurality of structural supporting members is a porous, cylindrical rod.

3. The ion-transport membrane assembly of claim 2, wherein said porous material has a porosity of between about 20% and about 90%.

4. The ion-transport membrane assembly of claim 2, wherein said porous material has a porosity of between about 40% and about 85%.

5. The ion-transport membrane assembly of claim 1 or claim 2 or claim 4 wherein said porous material is fabricated from a reticulated foam.

6. The ion-transport membrane assembly of claim 5, wherein said porous material is MgO, $Al_2O_3$, CeO2, or $ZrO_2$.

7. The ion-transport membrane assembly of claim 6, wherein said membrane is a composite membrane having a dense layer connected to at least one porous layer.

8. The ion-transport membrane assembly of claim 1, wherein said at least one ion-transport material is a mixed conducting material.

9. The ion-transport membrane assembly of claim 1, wherein said porous material is MgO, $Al_2O_3$, $CeO_2$, or $ZrO_2$.

* * * * *